(12) United States Patent
Kim

(10) Patent No.: US 8,150,622 B2
(45) Date of Patent: Apr. 3, 2012

(54) TRAFFIC INFORMATION SERVICE BASED ON TRAFFIC INFORMATION TRANSMITTED TO A NAVIGATION SYSTEM

(75) Inventor: Hyoung-Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 780 days.

(21) Appl. No.: 11/276,168

(22) Filed: Feb. 16, 2006

(65) Prior Publication Data

US 2006/0184322 A1 Aug. 17, 2006

(30) Foreign Application Priority Data

Feb. 16, 2005 (KR) ........................ 10-2005-0012587

(51) Int. Cl.
*G06F 17/30* (2006.01)

(52) U.S. Cl. .................. 701/428; 701/410; 340/995.13; 707/751; 707/758; 345/601; 708/235

(58) Field of Classification Search .................. 701/117, 701/208–211; 340/995.13, 995.14, 995.12; 707/751, 758, 781; 370/401, 206; 715/711; 345/601; 708/235; *G06F 17/30*
See application file for complete search history.

(56) References Cited

U.S. PATENT DOCUMENTS

| | | | | | |
|---|---|---|---|---|---|
| 5,748,763 | A | * | 5/1998 | Rhoads | 382/115 |
| 5,799,010 | A | * | 8/1998 | Lomp et al. | 370/335 |
| 5,799,017 | A | * | 8/1998 | Gupta et al. | 370/419 |
| 5,841,978 | A | * | 11/1998 | Rhoads | 709/217 |
| 5,951,620 | A | * | 9/1999 | Ahrens et al. | 701/200 |
| 6,381,536 | B1 | * | 4/2002 | Satoh et al. | 701/208 |
| 6,438,561 | B1 | * | 8/2002 | Israni et al. | 707/104.1 |
| 7,209,578 | B2 | * | 4/2007 | Saito et al. | 382/128 |
| 7,877,468 | B2 | * | 1/2011 | Abadir et al. | 709/223 |
| 2003/0083813 | A1 | * | 5/2003 | Park | 701/210 |
| 2005/0187708 | A1 | * | 8/2005 | Joe et al. | 701/210 |
| 2005/0259606 | A1 | * | 11/2005 | Shutter et al. | 370/317 |

FOREIGN PATENT DOCUMENTS

| | | |
|---|---|---|
| EP | 0899703 A1 | 3/1999 |
| JP | 07-63572 A | 3/1995 |
| JP | 10-020776 A | 1/1998 |
| JP | 2002-092791 A | 3/2002 |
| KR | 10-1999-0023843 A | 3/1999 |
| KR | 10-1999-0076081 A | 10/1999 |
| KR | 10-0353649 B1 | 9/2002 |
| KR | 10-2002-0095766 A | 12/2002 |

OTHER PUBLICATIONS

Korea Office Action dated Aug. 28, 2006 for Application No. 10-2005-0012587, with English translation, 7 pages.
PCT International Search Report and Written Opinion dated Jun. 23, 2006 for Application No. PCT/KR/2006/00053, 12 pages.

* cited by examiner

*Primary Examiner* — Tuan C. To

(74) *Attorney, Agent, or Firm* — Fish & Richardson P.C.

(57) ABSTRACT

A method and apparatus for providing a traffic information service to a vehicle. Traffic information is broadcast through an external network to the vehicle, wherein the traffic information is based on a first map. Data within the broadcasted traffic information and based on a the first map is compared to a second map provided in a vehicle navigation unit, wherein the second map is different than the first map. A traffic information service is provided to the vehicle navigation unit, wherein the vehicle navigation unit is configured for displaying the traffic information with the second map.

18 Claims, 3 Drawing Sheets

FIG. 5
| First Map Link | Type | Number of Links | Link ID | Proportion | Link ID | Proportion |
|---|---|---|---|---|---|---|
| A | 0 | 1 | a | 1 | -- | -- |
| B | 1 | 1 | b | p | -- | -- |
| C | 1 | 1 | b | 1-p | -- | -- |
| D | 2 | 2 | c | q | d | 1-q |
| E | 2 | 2 | e | r | f | t* (1-r) |
| F | 2 | 2 | f | s* (1-t) u*(1-s) | u | -- |
| G | 1 | 1 | g | 1-u | -- | -- |
FIG. 6
Data on a first map
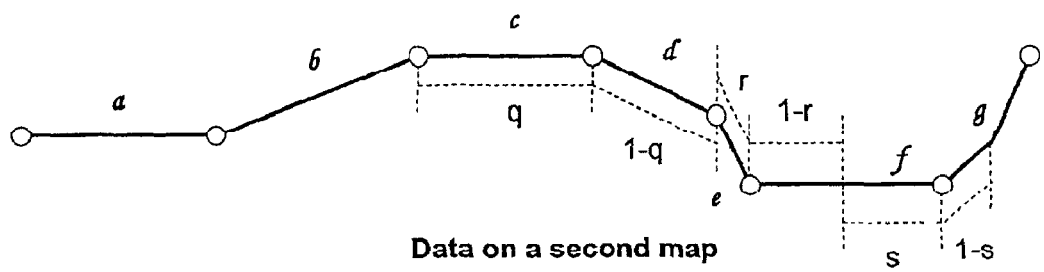
Data on a second map
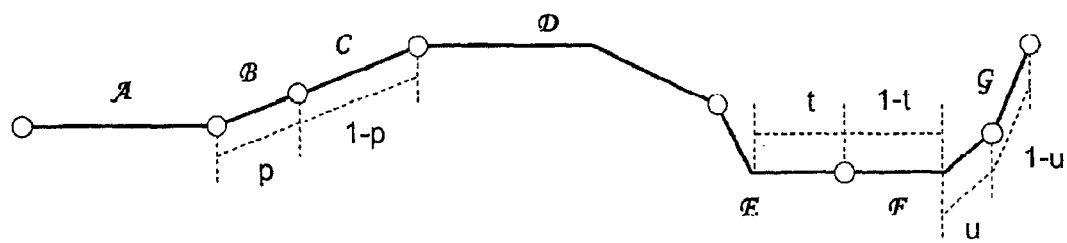

TRAFFIC INFORMATION SERVICE BASED ON TRAFFIC INFORMATION TRANSMITTED TO A NAVIGATION SYSTEM

BACKGROUND

This description relates to providing a traffic information service based on traffic information transmitted to a navigation system.

Navigation devices, such as in motor vehicles, provide a travel route between a start point and a destination point, guide a user according to the travel route, and/or identify a point of interest (POI) around the traveling route to the user. Navigation devices receive traffic information, such as a traffic situation of a particular road from a remote server, and search an optimum route based on the traffic information and/or display the traffic information. The traffic information may include information relating vehicle speed, road conditions, and/or traffic conditions, such as a traffic accident on a road.

Navigation devices include a radio communication unit for receiving the traffic information from a remote server. The radio communication unit is connected with the remote server according to a pre-set communication protocol and receives traffic information data including the traffic information from the remote server. However, the traffic information typically is provided in a data format previously set between the remote server and the navigation device.

SUMMARY

In one general aspect, a method for providing a traffic information service to a vehicle includes broadcasting traffic information through an external network to the vehicle, wherein the traffic information is based on a first map, providing data, within the broadcasted traffic information, which enables a relationship to be established between the traffic information that is based on the first map and a second map to be rendered by a vehicle navigation unit, wherein the second map is different than the first map, and based on the traffic information, providing a traffic information service to the vehicle navigation unit, wherein the vehicle navigation unit is configured for displaying the traffic information with the second map.

Implementations of this aspect may include one or more of the following features.

Broadcasting includes broadband broadcasting the traffic information through the external network to the vehicle. The data within the broadcasted traffic information includes a link ID relating the first map to the second map. The link ID identifies one or more of a road segment, a landmark, and a guide point. The data within the broadcasted traffic information includes data corresponding to a look-up table within the vehicle navigation unit, wherein the look-up table defines relationships between the first map and the second map.

A look-up table in the vehicle navigation unit is updated, wherein the look-up table contains data linking the first map and the second map. The traffic information service includes information relating to one or more of a travel route, road conditions, or traffic conditions.

In another general aspect, a method for providing a traffic information service includes receiving traffic information through an external network, wherein the traffic information is based on a first map, associating the traffic information based on the first map with a second map to be rendered in a vehicle navigation unit, wherein the second map is different than the first map, and providing a traffic information service based on the traffic information associated with the second map in the vehicle navigation unit.

Implementations of this aspect may include one or more of the following features.

The traffic information is broadcast by broadband through the external network to a vehicle.

The method includes accessing data linking the first map and the second map through a link ID of the first map, wherein associating the traffic information based on the first map comprises comparing the link ID of the first map that is received with the traffic information to a link ID of the second map.

The link ID identifies one or more of a road segment, a landmark, and location coordinates.

Associating the traffic information based on the first map with the second map includes comparing data contained in the traffic information with a look-up table.

The look-up table is stored in the vehicle navigation system.

The look-up table reflects a relationship between a link ID of the first map and a link ID of the second map.

Map data in the vehicle navigation unit is updated, wherein the map data contains data linking the first map and the second map. The map data is provided in a look-up table which is valid for a limited period of time or is valid for a limited number of uses.

The traffic information and a link ID associated with the first map and the second map are stored in a traffic information table in the navigation unit.

The traffic information includes assessing the reliability of the traffic information based on the first map, identifying a link ID associated with the first map in a look-up table in the navigation unit, and identifying a link ID of the second map in the look-up table corresponding to the link ID of the first map.

The traffic information service includes providing data to the navigation unit for guiding a vehicle through a route, matching a link ID of the second map with the traffic information based on the first map, determining a weighted value of the link ID of the second map based on the traffic information matched with the second map, and searching the route based on the weighted value of the link ID.

The traffic information service includes providing real time traffic information and vehicle guidance to the navigation unit based on link IDs of the second map, and displaying traffic information associated with each link ID.

The traffic information service includes defining a travel route, and providing a summary report of traffic information relating to the defined travel route, wherein the summary report includes road conditions or traffic conditions relating to the travel route.

In another general aspect, an apparatus for receiving information relating to road and traffic conditions includes a receiving unit for receiving traffic information based on a first map, wherein the receiving unit is configured for receiving traffic information transmitted through a broadband broadcast, a navigation unit configured for providing information relating to road and traffic conditions provided with the traffic information based on the first map from the receiving unit, and a storage unit containing a look-up table, wherein the look-up table defines a relationship between the received traffic information based on the first map and a second map to be rendered by the navigation unit.

Implementations of this aspect may include one or more of the following features.

The look-up table reflects a relationships between a link ID of the first map and a link ID of the second map.

The look-up table is valid for a limited period of time or is valid for a limited number of uses A pre-processing unit is configured to associate the traffic information with a link ID of the second map based on the look-up table. A traffic information storage unit is configured for storing information obtained by associating the traffic information and the link ID of the second map, the traffic information storage unit including a traffic information table.

The pre-processing unit is configured to assess the reliability of the traffic information, to associate the look-up table with the link ID of the first map, and to associate the link ID of the second map with the link ID of the first map.

BRIEF DESCRIPTION OF THE DRAWINGS

FIG. 5 is an exemplary look-up table reflecting a relationship between data on a first map and data on a second map.

FIG. 6 illustrates a roadway rendered on a first map and a second map.

DETAILED DESCRIPTION

A method and apparatus for providing a traffic information service based on traffic information broadcast over a network to a navigation system, such as broadcasting through a broadband network, to motor vehicles equipped with vehicle navigation systems. With broadband broadcasting, traffic information is sent over a wide area and at reduced cost. Moreover, the method and apparatus are configured to enable use of the broadcast traffic information by the variety of different navigation systems that receive the broadcast information. For example, in one implementation, if the first map system used for generating the traffic information which is broadcasted by the remote server is different from a map system of the navigation device, the navigation device is configured to efficiently relate aspects of the different map systems and thereby process the traffic information.

For example, the map data can be represented as data in a look-up table which is valid for a predetermined period of time and/or is valid for a predetermined number of uses. Accordingly, a navigation system can be provided with a look-up table after payment of a user fee or as a condition of payment for a subscription. The look-up table includes information relating the traffic information and various link IDs associated with the first map and the second map in a traffic information table, such as within the navigation unit. The accuracy of incoming traffic information can be assessed and associated with the first and the second map systems. Associating the first and the second map systems can include identifying a link ID associated with the first map in a look-up table in the navigation unit, and/or identifying a link ID of the second map in the look-up table associated with the link ID of the first map.

Figure 1:
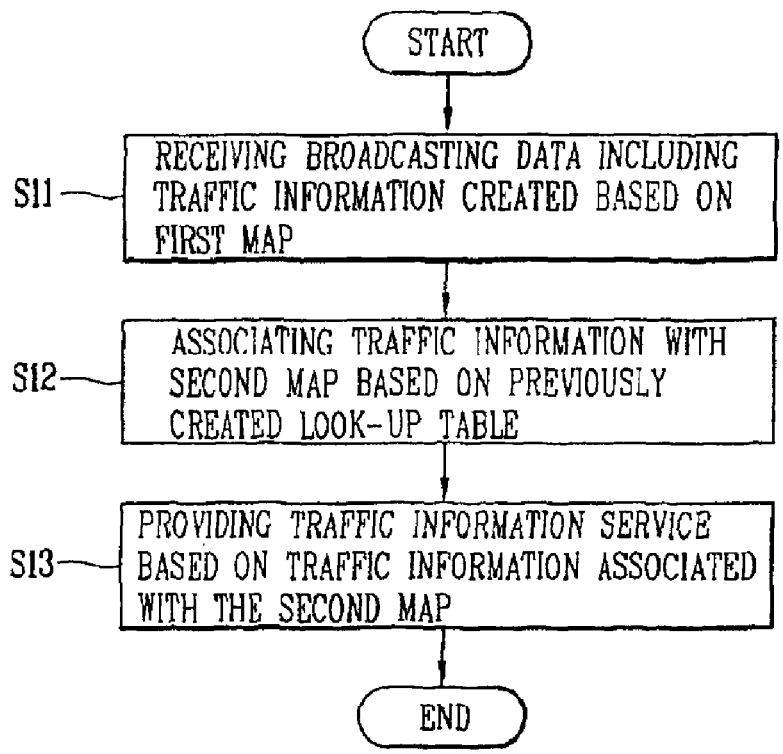
FIG. 1 is a flow chart illustrating a process for providing a traffic information service.

Referring to FIG. 1, an exemplary process for providing a traffic information service, e.g., based on broadband broadcasting, includes receiving traffic information which has been generated based on a first map (step S11), e.g., at a remote server. The traffic information is associated with a second map based on a previously generated look-up table (step S12). The traffic information service is provided based on the traffic information associated with the second map (step S13). The traffic information can include information relating to units of area or road, and can further include one or more of the following, including vehicle speed on a particular road, traffic congestion, traffic incidents or accidents, road closures and/or weather conditions on the road.

The look-up table includes data relating the first map to the second map. The first map is a map on which the traffic information is based, and the traffic information can be generated as information associated with a link of the first map based on the first map. The second map is a map provided within a navigation unit, e.g., a device within a vehicle or mobile object for providing traffic information service through audio or visual cues. The second map can be different from the first map in that the first map was generated by a different cartographer than that of the second map. The first map can include defining data relating to map layout and content which differs in content or structure from that of the second map. The first map data can also be sent through a different transmission protocol or have different data structures than that of the second map data.

In typical wireless communication of traffic information, targeted information is typically requested and sent to navigation units in an inefficient and at higher cost. However, if the traffic information is transmitted via broadband broadcasting, the navigation unit can receive the necessary traffic information faster and at relatively lower cost. For example, large amounts of traffic information can be sent as common information to all navigation units (users) within a broadband network, e.g., targeted information requests by a user are not necessarily required. For example, broadband broadcasting can be achieved through various broadband data transmission options, including a terrestrial DMB (Digital Multimedia Broadcasting) and/or a satellite DMB.

Referring to FIG. 1, the navigation unit receives the broadband broadcasting data including the traffic information (step S11). For example, the traffic information can be receives as information associated with a link ID of the first map to allow the traffic information service providing apparatus to identify a link of the first map associated with the traffic information. The navigation unit associates the traffic information with the second map, e.g., based on a previously generated look-up table (step S12). The look-up table includes information obtained by matching the first and second maps so that maps originating from different systems can have their data displayed accurately in either format.

However, since the first and second map may have different node and link system, it is not always possible for the navigation unit having the second map to use the traffic information based on the first map. Accordingly, by broadband broadcasting, the first map and second map are previously compared and relationships between two or more map systems are stored in the look-up table, e.g., the look-up table contains common features or parameters that link information from one map system to another map system. The look-up table can be stored in a memory device within the navigation unit or connected to the navigation unit, e.g., in an external and/or portable memory device.

The first and second maps can be matched by associating a plurality of link IDs included in each map. The generation of the look-up table will be described in greater detail with reference to FIG. 2. The navigation unit provides the traffic information service based on the look-up table (step S13). Namely, the navigation unit provides the following exemplary traffic information service based on the look-up table including the information obtained by matching the first and second maps. The traffic information service can be a route guidance service which determines a weighted value of each link of the second map based on the traffic information matched with the second map, searches a route based on a weighted value of each link, and provides a route based on the result of the route search result.

The traffic information service can be provided as real-time traffic information. For example, the real-time traffic information includes providing traffic information to the navigation unit in real-time, associating the traffic information to each link of the second map, and displaying the traffic information associated with each link in real time.

In addition, or alternatively, the traffic information service include a summarized or annotated traffic service. For example, a user can define a route through a navigation unit and the traffic information can be provided responsive to the defined route. Alternatively, a traffic route can be suggested to a user based on the traffic information service and an input of starting and/or destination points at the navigation unit.

The traffic information service can providing information relating to traffic conditions or incidents, such as the occurrence of a traffic accident on the route selected by the user or a traveling route in real time based on the traffic information.

The navigation unit does not necessarily provide the traffic information service as soon as or each time the traffic information is received by the navigation unit. For example, the traffic information service can be provided continuously or at predetermined intervals, responsive to a user request, or responsive to movement of the navigation unit from one area range to another. Alternatively, a user may scroll through a map area that is outside the present coverage area to receive updates about other regions, e.g., a travel area that the user may be approaching in a few hours and selected by the user with a link designating a landmark, road segment and/or location coordinates, such as a city name or latitude and longitude coordinates.

The navigation unit stores the traffic information, and then, when the user requests it, the navigation unit provides the traffic information service based on the stored traffic information. However, since the stored traffic information is the information associated with the link IDs of the first map, the navigation unit performs the operation for associating the stored traffic information with the link IDs of the second map. The navigation unit searches a link ID of the first map associated with the traffic information based on the look-up table, and then search a link ID of the second map matched with the link ID of the first map.

However, the operation of associating the stored traffic information with the link ID of the second map requires time, memory, and/or processing capability. Therefore, a navigation unit that is constantly processing traffic information can become encumbered with large processing tasks. Therefore, the navigation unit can receive traffic information service based on the broadband broadcasting and may additionally be provided with the ability to associate the traffic information with the link ID of the second map and to storing the traffic information in a traffic information table. Accordingly, instead of constantly processing and comparing incoming traffic data with a look-up table, a cached or stored traffic information table can store comparative results that have been previously processed by the navigation unit based on two discrete map systems.

Figure 2:
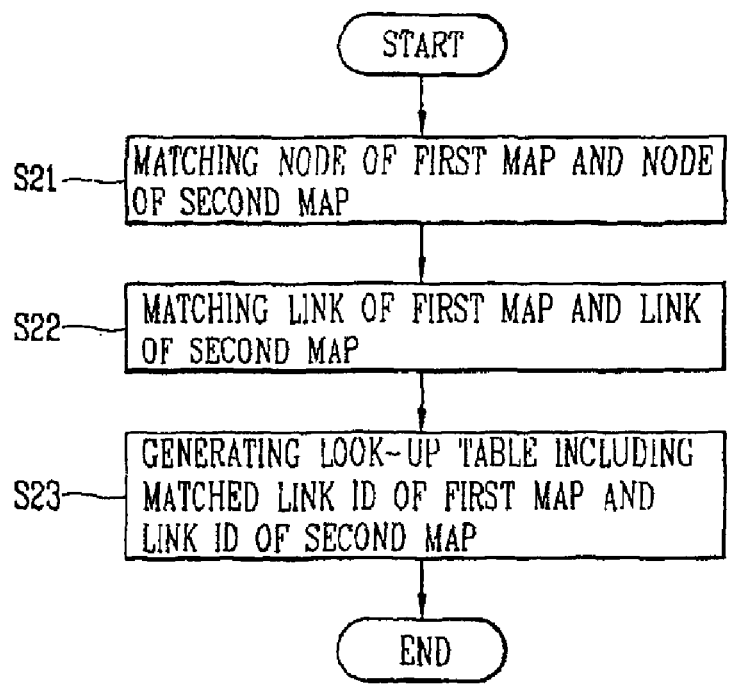
FIG. 2 is a flow chart illustrating a process for generating a look-up table.

Referring to FIG. 2, generating a look-up table includes matching a traffic information measurement node of the first map and a node of the second map (step S21), matching a link of the first map and a link of the second map (step S22), and generating a look-up table including matched link IDs of the first and second maps (step S23).

In step S21, a traffic information measurement node on a first map is matched with a node on the second map. Specifically, a traffic information measurement node presented within a pre-set distance from a node on the second map is matched with the node on the second map. Subsequently, a traffic information measurement node existing at other portion than at the pre-set distance is matched with a feature node of the second map. Herein, the feature node is a node existing on a link between nodes of the second map. In the node matching process and the feature node matching process, a traffic information measurement node which has not been matched at coordinates of the second map can be forcibly designated at a node of the second map or can be forcibly excluded.

For example, a first traffic information node and a second traffic information node on the first map have a link extending between the nodes of a pre-set distance. A feature node on the second map can be used, along with the pre-set distance between the first and second traffic information nodes of the first map to identify possible second feature nodes on the second map. A link (and a second feature node) having a distance that most closely corresponds to the link of the first map are identified as the actual, second feature node. Referring to FIGS. 6, an exemplary roadway is rendered on a first map and a second map. Although the roadway is rendered on the first map with a series of links between traffic information nodes (a-g), the roadway is similarly rendered on a second map with a series of links between feature nodes (A-G). FIG. 5 contains data linking the data of the first map with the data of the second map.

Referring to FIG. 5, the look-up table includes data identifying links between pairs of traffic information nodes on the first map and identifying links between pairs of feature nodes from the second map. Once a link on the first map has been positively matched to a link on the second map, a second information table which includes associated results, e.g., any matched links that have already been processed, can be updated and stored for associating traffic information data without having to process the incoming traffic information for the same node or link each with each occurrence with the look-up table.

In step S22, the traffic information measurement nodes of the first map each matched with the nodes of the second map are matched with a link of the second map based on the connectivity with adjacent coordinates. Specifically, when the traffic information measurement nodes of the first map are matched with the nodes of the second map in the processing of matching the nodes (step S21), the link connecting the first map and the traffic information measurement node is matched with the link of the second map in a one-to-one manner.

The traffic information measurement node of the first map is mapped with the feature node of the second map in the step of matching the feature node (step S22), and the links connecting the two or more traffic information measurement nodes of the first map are matched with the link of the second map. In this case, the links connecting the two or more traffic information measurement nodes of the first map can be matched with the link of the second map at a different traffic information reflection ratio according to a length ratio of each link.

In step S23, a look-up table is generated based on the matched links of the first and second maps. The look-up table includes the matched link IDs of the first and second maps. The matched link IDs of the first and second maps can be aligned according to the order of the link ID for the convenience of searching. In addition, when there are a plurality of IDs of the first map matched with the link IDs of the second map and there are a plurality of link IDs of the first map matched with the link IDs of the second map, the look-up table may include a traffic information reflection ratio of the links of the first map, e.g., which may be used to assess the accuracy of the map data. Referring to FIG. 5, an exemplary look-up table includes first map link IDs, second map link IDs which correspond to the first map link IDs and an information reflection ratio of the links of the first map.

The look-up table can facilitate the traffic information service based on the traffic information included in the broadband broadcasting data. Namely, the look-up table can increase compatibility between arbitrary broadband broadcasting data and the navigation unit based on the different map systems.

Data within the navigation unit and/or the look-up table and/or can be updated remotely or with local, software updates. Updating of the look-up table can be performed by changing a matching relationship between the link ID of the first map and the link ID of the second map.

If the look-up table provided in the navigation unit is not updated remotely, e.g., through a wireless transmitted software patch, the navigation unit can be updated locally through a software update installed by the user or a technician at a service center. The periodical updating of the look-up table can also serve as a basis for allocating user-service fees, e.g., as the basis for a subscription service. For example, the look-up table can be configured to expire or be rendered inaccessible after repeated uses, e.g., after three uses, or after a predetermined period has elapsed, such as three months. Therefore, the look-up table can be set to be used within a pre-set expiration time or period and to be reactivated or replaced after payment of a reactivation fee or subscription renewal.

Figure 3:
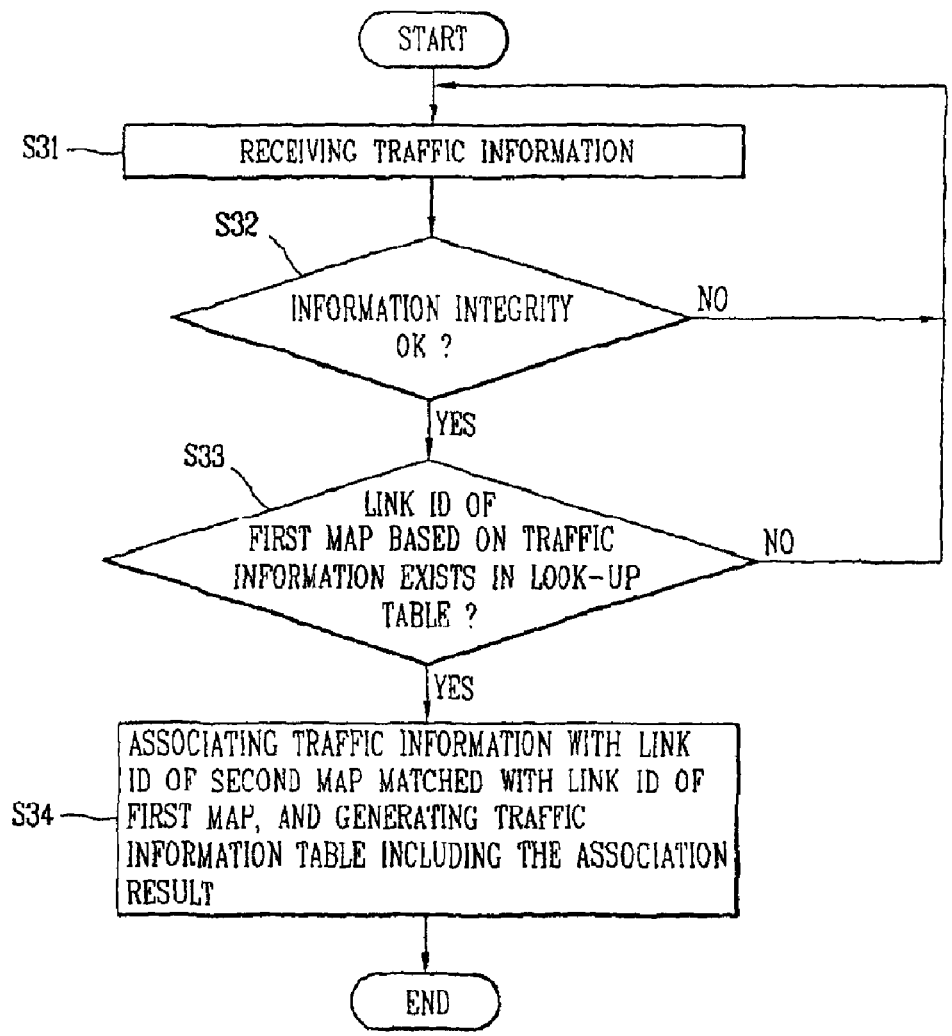
FIG. 3 is a flow chart illustrating a process for generating a traffic information table.

Referring to FIG. 3, generating the traffic information table includes receiving broadband broadcasting data including traffic information (step S31), assessing the integrity of the traffic information (step S32), assessing whether a link ID of the first map based on the traffic information exists in the look-up table (step S33), and associating the traffic information with a link ID of the second map matched with the link ID of the first map based on the look-up table and generating a traffic information table including the associated results.

The navigation unit receives broadband broadcasting data including traffic information, and assesses the integrity or reliability of the traffic information (steps S31 and S32). The navigation unit can receive the broadband broadcasting data including the traffic information when it is in an ON state or at every pre-set reception period. The integrity of the traffic information can be checked by an arbitrary error checking method such as CRC (Cyclic Redundancy Checking).

When the integrity of the traffic information is confirmed, the navigation unit searches whether the link ID of the first map based on the traffic information exists in the look-up table (step S33). The navigation unit searches the look-up table for the link ID of the first map based on the traffic information to check whether the traffic information can be associated with the link ID of the second map.

If the link ID of the first map based on the traffic information exists in the look-up table, the navigation unit associates the link ID of the second map matched with the link ID of the first map, and generates a traffic information table including the association result (step S34). The traffic information table can include the link ID of the second map and the traffic information associated with the link ID. For example, the traffic information table can be updated when additional traffic information is received.

Figure 4:
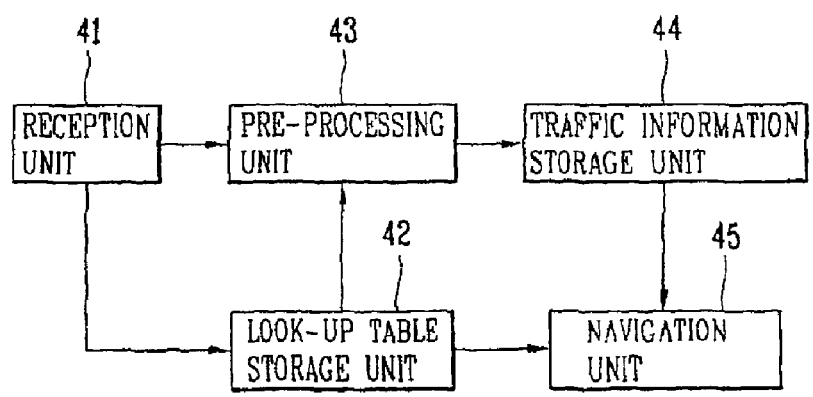
FIG. 4 is a block diagram showing details of an apparatus for providing the traffic information service based on broadcasted information.

Referring to FIG. 4, the navigation unit for providing the broadband broadcasting-based traffic information service includes a receiver configured for receiving broadband broadcasting 41, particularly for receiving broadband broadcasting data including traffic information. The navigation unit includes a look-up table storage unit 42, such as an internal memory device, for storing a look-up table including a result obtained matching first and second maps. The navigation unit includes a pre-processing unit 43 for associating the traffic information with a link ID of the second map based on the look-up table, and a traffic information storage unit 44 for storing a traffic information table including the result obtained by associating the traffic information and the link ID of the second map. The traffic information storage unit 44 can be the same memory device as storage unit 42 or a separate memory device. A navigation unit module 45 for providing a traffic information service based on the traffic information and the stored look-up table, or based on the traffic information table. The navigation unit can be a monolithic device including both a navigation module 45 and a traffic information service module within the same unit. Alternatively, the navigation unit can be merely operatively connected to a separate traffic information service unit.

The first map is a map on which the traffic information is based, and the traffic information can be generated as information associated with a link of the first map based on the first map. In addition, the second map is a map provided in the navigation unit such as, e.g., the navigation device, which provides a traffic information service such as displaying a current location of a vehicle based on the second map and searching a traveling route of the vehicle.

The navigation unit 45 can include a GPS (Global Positioning System) signal reception unit, a self sensor, a second map storage unit, a controller or a display unit and can provide a service such as searching and guiding a route or searching a POI (point of Interest). The broadband broadcasting reception unit 41 receives traffic information through a broadband broadcasting process. The traffic information received by the broadband broadcasting reception unit 41 can be received as information associated with a link ID of the first map. The broadband broadcasting reception unit 41 can be installed integrally with or separately from the navigation unit.

The look-up table storage unit 42 stores a look-up table including a result obtained by matching the first map on which traffic information is based and the second map provided in the navigation unit. The look-up table stored in the look-up table storage unit 42 can include a link ID of the first map and a link ID of the second map matched with a link ID of the first map. In addition, the look-up table can be updated or can be used within a pre-set expiry time or within a pre-set number of times of usage.

The look-up table and the content of the look-up table are generated in a manner similar to the case described above with reference to FIGS. 1 and 2. The pre-processing unit 43 previously associates traffic information associated with the first map with the second map. Specifically, the pre-processing unit 43 searches a link ID of the second map matched with a link ID of the first map included in the traffic information based on the look-up table stored in the look-up table storage unit 42, and associates the traffic information with the link ID of the second map. The traffic information storage unit 44 stores a traffic information table including the results obtained by associating the traffic information with the link ID of the second map so that the navigation unit can access cached or preprocessed traffic information and harmonized map data, e.g., so the harmonization of data from discrete map systems does not need to be repeated continuously.

The operation of associating the traffic information with the link ID of the second map performed by the pre-processing unit 43 and the content of the traffic information table stored in the traffic information storage unit 44 are similar to the case described above with reference to FIGS. 1 and 3. The navigation unit 45 provides a traffic information announcement service based on the traffic information and the look-up table or based on the traffic information table.

Specifically, the navigation unit 45 can associate traffic information received in real time with the link ID of the second map based on the look-up table stored in the look-up table storage unit 42, and provide the traffic information announcement service based on the association result. Alternatively, the navigation unit 45 can provide the traffic information announcement service based on the traffic information table stored I the traffic information storage unit 44, e.g., based on the traffic information previously associated with the link ID of the second map.

The traffic information announcement service provided by the navigation unit 45 can be a route search and route guidance service which uses the traffic information as a weighted value of each link of the second map, a real time traffic information guidance service for providing real time traffic information of each link of the second map based on the traffic information, a brief or annotated traffic information guidance service for providing briefed traffic information of a route selected by the user based on the traffic information; or an accident occurrence announcement service for providing information regarding occurrence of an accident of the route selected by the user based on the traffic information.

Specifically, the traffic information announcement service provided to the navigation unit 45 is similar to the case described with reference to FIG. 1. The foregoing implementations can be applicable to many navigation devices and/or a telematics system providing traffic information, and also can be applicable to a hand-held device or a mobile terminal.

As so far described, the foregoing implementations may provide one or more of the following features. For example, since common traffic information can be broadcasted and received through broadband broadcasting, regardless of a communication environment, geographic area or individual user requirements, the traffic information can be received through wireless communication in an efficient manner. By providing the look-up table for associating the traffic information with the second map, compatibility is achieved between various broadband broadcasting data protocols and heterogeneous navigation units.

By setting an expiration time or period, e.g., a subscription term for the operability of the look-up table, or limiting the number of times of usage of the look-up table, the navigation unit can provide a fee-based traffic information service that is easily updated and billed. Since the traffic information is previously associated with the second map, a traffic information table including the association result is stored, and the traffic information service is provided based on the traffic information table, the traffic information service can be quickly provided responsive to a user request.

In addition, even if communication is performed between a navigation unit and a remote server operating through different data formats or transmission protocols, the navigation device can harmonize and/or synchronize the use of real-time traffic, road and vehicle related conditions and travel route details, e.g., between a navigation system based on one mapping system and receiving information providing from a remote server and based on a different mapping system. Accordingly, various broadcasting methods, including broadband may be utilized efficiently.

What is claimed is:

1. A method for providing a traffic information service to a vehicle comprising:
   broadband broadcasting traffic information through an external network to the vehicle, wherein the traffic information is based on a first map configured to include a traffic information measurement node that comprises the traffic information;
   providing data, within the broadcasted traffic information, the data comprising a set of link IDs that relates the first map with a second map to be rendered by a vehicle navigation unit, wherein the second map is different from the first map, and wherein the set of link IDs are configured to identify at least one of a road segment, a landmark and a guide point in the first and second map;
   translating, the traffic information measurement node matched from the first map to the second map, the translation comprising:
      determining, on the first map, whether a link ID in the set of link IDs is located within a pre-set distance from the traffic information node;
      responsive to determining that the link ID in the set of link IDs is located within the pre-set distance from the traffic information node, identifying, on the second map, a location of the traffic information node with the pre-set distance and the link ID; and
      responsive to determining that the link ID in the set of link IDs is located outside of the pre-set distance from the traffic information node, translating the traffic information node onto the second map, the translating of the traffic information node onto the second map comprising:
         identifying, on the first map, at least two link IDs between for which the traffic information node is located;
         determining, on the first map, a ratio of distances between the at least two link IDs and the traffic information node;
         identifying the location, on the second map, of the traffic information node with the ratio of distances and at least one link ID;
   based on the traffic information, providing a traffic information service to the vehicle navigation unit, wherein the vehicle navigation unit is configured for displaying the traffic information with the second map,
   wherein map data in the vehicle navigation unit includes data linking the first map and the second map, the map data being provided in a look-up table that is valid for one of a period of time and a number of uses, the look-up table being configured to establish a relationship between the first map and the second map only when the look-up table is valid.

2. The method of claim 1, wherein the data within the broadcasted traffic information includes data corresponding to the look-up table within the vehicle navigation unit, wherein the look-up table defines relationships between the first map and the second map.

3. The method of claim 1, wherein the look-up table includes a traffic information reflection ratio that is related to links of the first map and used for accuracy assessment of map data.

4. The method of claim 1, wherein the traffic information service includes information relating to one or more of a travel route, road conditions, or traffic conditions.

5. The method of claim 1, wherein the look-up table is updated by a software patch that is periodically sent to the vehicle navigation unit via wireless transmissions.

6. A method for receiving a traffic information service comprising:
    receiving, through broadband broadcasting, traffic information through an external network, wherein the traffic information is based on a first map configured to include a traffic information measurement node that comprises traffic information;
    accessing data, within the broadcasted traffic information, the data comprising a set of link IDs that relates the first map with a second map to be rendered by a vehicle navigation unit, wherein the second map is different than the first map and wherein the set of link IDs are configured to identify at least one of a road segment, a landmark and a guide point in the first and second map;
    associating the traffic information measurement node matched from the first map to the second map, the associating comprising:
        determining, on the first map, whether a link ID in the set of link IDs is located within a pre-set distance from the traffic information node;
        responsive to determining that the link ID in the set of link IDs is located within the pre-set distance from the traffic information node, identifying, on the second map, a location of the traffic information node with the pre-set distance and the link ID; and
        responsive to determining that the link ID in the set of link IDs is located outside of the pre-set distance from the traffic information node, translating the traffic information node onto the second map, the translating of the traffic information node onto the second map comprising:
            identifying, on the first map, at least two link IDs between which the traffic information node is located;
            determining, on the first map, a ratio of distances between the at least two link IDs and the traffic information node;
            identifying the location, on the second map, of the traffic information node with the ratio of distances and at least one link ID; and
    providing a traffic information service to a user via the vehicle navigation unit based on the traffic information associated with the second map in the vehicle navigation unit,
    wherein map data in the vehicle navigation unit includes data linking the first map and the second map, the map data being provided in a look-up table that is valid for one of a period of time and a number of uses, the look-up table being configured to establish a relationship between the first map and the second map only when the look-up table is valid.

7. The method of claim 1, wherein associating the traffic information based on the first map with the second map comprises comparing data contained in the traffic information with the look-up table.

8. The method of claim 7, wherein the look-up table is stored in the vehicle navigation system.

9. The method of claim 7, wherein the look-up table reflects a relationship between the link ID of the first map and the link ID of the second map.

10. The method of claim 6, further comprising storing the traffic information and a link ID associated with the first map and the second map in a traffic information table in the navigation unit.

11. The method of claim 6, wherein associating the traffic information comprises:
    identifying a link ID associated with the first map in the look-up table in the navigation unit; and
    identifying a link ID of the second map in the look-up table corresponding to the link ID of the first map.

12. The method of claim 6, wherein the traffic information service comprises:
    providing data to the navigation unit for guiding a vehicle through a route;
    matching a link ID of the second map with the traffic information based on the first map;
    determining a weighted value of the link ID of the second map based on the traffic information matched with the second map; and
    searching the route based on the weighted value of the link ID.

13. The method of claim 6, wherein the traffic information service comprises:
    providing real time traffic information and vehicle guidance to the navigation unit based on link IDs of the second map; and
    displaying traffic information associated with each link ID.

14. The method of claim 6, wherein the traffic information service comprises:
    defining a travel route; and
    providing a summary report of traffic information relating to the defined travel route, wherein the summary report includes road conditions or traffic conditions relating to the travel route.

15. The method of claim 6, wherein the look-up table includes a traffic information reflection ratio that is related to links of the first map and used for accuracy assessment of map data.

16. The method of claim 6, further comprising receiving, at the vehicle navigation unit via wireless transmissions, a software patch, and updating the look-up table based on the software patch.

17. An apparatus for receiving information relating to road and traffic conditions comprising:
    a receiving unit for receiving traffic information based on a first map configured to include a traffic information measurement node that comprises the traffic information, wherein the receiving unit is configured for receiving the traffic information transmitted through a broadband broadcast;
    a navigation unit configured for outputting to a user, information relating to road and traffic conditions provided with the traffic information based on the first map from the receiving unit;
    a storage unit containing a look-up table, wherein the look-up table defines a relationship between the received traffic information based on the first map and a second map to be rendered by the navigation unit;
    a pre-processing unit configured to associate the traffic information with a link ID of the second map based on the look-up table, the associating the traffic information with the link ID of the second map comprising:
        determining, on the first map, whether a link ID of the first map is located within a pre-set distance from the traffic information node;
        responsive to determining that the link ID of the first map is located within the pre-set distance from the traffic information node, identifying, on the second map, a location of the traffic information node with the pre-set distance and the link ID of the second map, wherein the link ID of the second map is derived from the link ID of the first map through the look-up table; and responsive to determining that the link ID of the first map is located outside of the pre-set distance from the traffic information node, translating the traffic information node onto the second map, the translating of the traffic information node onto the second map comprising:

- identifying, on the first map, at least two link IDs of the first map between which the traffic information node is located;
- determining, on the first map, a ratio of distances between the at least two link IDs of the first map and the traffic information node;
- identifying the location, on the second map, of the traffic information node with the ratio of distances and at least one link ID of the second map, the link ID of the second map derived from at least one link ID of the first map through the look-up table; and a traffic information storage unit configured for storing information obtained by associating the traffic information and the link ID of the second map, the traffic information storage unit including a traffic information table.

18. The apparatus of claim 17, wherein the look-up table is updated by a software patch that is periodically received by the receiving unit via wireless transmission.

\* \* \* \* \*